US008019827B2

(12) United States Patent
Vaidya et al.

(10) Patent No.: US 8,019,827 B2
(45) Date of Patent: Sep. 13, 2011

(54) QUICK DEPLOY OF CONTENT

(75) Inventors: Gautam Vishwas Vaidya, Redmond, WA (US); Glen Buhlmann, Kirkland, WA (US); Gunawan Herri, Sammamish, WA (US); James S. Masson, Seattle, WA (US); Viktoriya Taranov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1234 days.

(21) Appl. No.: 11/205,739

(22) Filed: Aug. 15, 2005

(65) Prior Publication Data

US 2007/0038726 A1 Feb. 15, 2007

(51) Int. Cl.
*G06F 15/16* (2006.01)
(52) U.S. Cl. ........................................ 709/217; 709/202
(58) Field of Classification Search ........... 707/E17.116; 709/203, 206, 207, 217, 218, 219, 227, 232, 709/248, 249
See application file for complete search history.

(56) References Cited

U.S. PATENT DOCUMENTS

| | | | | |
|---|---|---|---|---|
| 5,812,773 | A | | 9/1998 | Norin |
| 5,987,476 | A | * | 11/1999 | Imai et al. ..................... 707/201 |
| 6,044,403 | A | * | 3/2000 | Gerszberg et al. ............ 709/225 |
| 6,119,167 | A | * | 9/2000 | Boyle et al. ................... 709/234 |
| 6,286,047 | B1 | * | 9/2001 | Ramanathan et al. ........ 709/224 |
| 6,351,761 | B1 | * | 2/2002 | Cantone et al. ............... 709/202 |
| 6,567,411 | B2 | * | 5/2003 | Dahlen ......................... 370/401 |
| 6,901,590 | B2 | * | 5/2005 | Narayanaswamy et al. .. 717/177 |
| 6,944,642 | B1 | | 9/2005 | Hopmann et al. |
| 6,999,991 | B1 | * | 2/2006 | Ikeda ............................ 709/206 |
| 7,277,913 | B2 | * | 10/2007 | Kashyap ....................... 709/203 |
| 7,356,593 | B1 | * | 4/2008 | Hasemann .................... 709/226 |
| 7,376,693 | B2 | * | 5/2008 | Neiman et al. ................ 709/201 |
| 7,464,176 | B2 | * | 12/2008 | Cohen et al. .................. 709/236 |
| 7,478,383 | B2 | * | 1/2009 | Shahindoust et al. ........ 717/172 |
| 2001/0032278 | A1 | * | 10/2001 | Brown et al. ................. 710/101 |
| 2001/0044834 | A1 | * | 11/2001 | Bradshaw et al. ............ 709/217 |
| 2002/0019855 | A1 | * | 2/2002 | Sakaguchi et al. ............ 709/218 |
| 2002/0143999 | A1 | * | 10/2002 | Yamagami ..................... 709/249 |
| 2003/0182319 | A1 | | 9/2003 | Morrison |
| 2003/0182652 | A1 | * | 9/2003 | Custodio ....................... 717/122 |
| 2004/0193952 | A1 | | 9/2004 | Narayanan et al. |

(Continued)

OTHER PUBLICATIONS

Black, Paul, "Level order traversal", Jul. 2, 2001, Retrieved from the Internet Archive on Apr. 16, 2009, <http://web.archive.org/web/20010716175232/http://www.itl.nist.gov/div897/sqg/dads/HTML/levelOrderTraversal.html>, 1 p.

(Continued)

*Primary Examiner* — Kamal B Divecha
*Assistant Examiner* — Madhu Woolcock
(74) *Attorney, Agent, or Firm* — Merchant & Gould, P.C.

(57) ABSTRACT

Non-administrators selectively move content from a source network to a destination network. The source network includes a deployment server that can deploy an item and its dependencies (if any) listed in a quick deploy list without having to get specific administrator authorization for the deployment. The deployment server can be configured to check the quick deploy list relatively frequently so that any items listed in the quick deploy list are quickly deployed. The listing of items in the quick deploy list is organized into "jobs" and identifies a path that indicates the source and destination for each job. A job is associated with one path and specifies one or more items of the source to be deployed and a schedule to deploy the specified item(s). The deployment server is configured by the administrator with permissions for specific authors to list items in the quick deploy list.

18 Claims, 6 Drawing Sheets

U.S. PATENT DOCUMENTS

2006/0048217 A1* 3/2006 Watkins .................. 726/11
2007/0050431 A1 3/2007 Vaidya et al.

OTHER PUBLICATIONS

Refsnes, Jan Egil, "Introduction to XML", Copyright 1999-2002, Retrieved from the Internet on Nov. 19, 2009, <url: http://web.archive.org/web/20021205160042/http://www.xmlfiles.com/xml/xml_intro.asp>, 2 pg.

"Tree-> Traversal", Retrieved from the Internet on Nov. 19, 2009, <http://web.archive.org/web/20020625163149/http://datastructures.itgo.com/trees/traversal.htm>, 1 pg.

Office Action dated Dec. 11, 2007 issued in U.S. Appl. No. 11/213,096, 12 pgs.

Office Action dated Oct. 7, 2008 issued in U.S. Appl. No. 11/213,096, 14 pgs.

Office Action dated Apr. 28, 2009 issued in U.S. Appl. No. 11/213,096, 16 pgs.

Office Action dated Jan. 22, 2010 issued in U.S. Appl. No. 11/213,096, 19 pgs.

Response to Office Action dated Jun. 11, 2008 filed in U.S. Appl. No. 11/213,096, 11 pgs.

Response to Office Action dated Feb. 9, 2009 filed in U.S. Appl. No. 11/213,096, 16 pgs.

Response to Office Action dated Jul. 28, 2009 filed in U.S. Appl. No. 11/213,096, 16 pgs.

Response to Office Action dated May 24, 2010 filed in U.S. Appl. No. 11/213,096, 15 pgs.

* cited by examiner

QUICK DEPLOY OF CONTENT

BACKGROUND

Content to be published can be created by authors on one network (e.g., an authoring network) and then moved to another network (e.g., a perimeter network) where the content can be accessed by others. Typically, an administrator controls the movement of the content from the authoring network to the perimeter network. The administrator can be a "bottleneck" when trying to quickly move content from the authoring network to the perimeter network. This background information is not intended to identify problems that must be addressed by the claimed subject matter.

SUMMARY

This summary is provided to introduce a selection of concepts in a simplified form that are further described below in the Detail Description Section. This summary is not intended to identify key features or essential features of the claimed subject matter, nor is it intended to be used as an aid in determining the scope of the claimed subject matter.

According to aspects of various described embodiments, non-administrators (including authors) can selectively move content from a source network to a destination network. In one aspect, the source network includes a deployment server that can deploy an item and its dependencies (if any) listed in a quick deploy list without having to get specific administrator authorization for the deployment. The deployment server can be configured to check the quick deploy list relatively frequently (e.g., every five minutes) so that any items listed in the quick deploy list are quickly deployed.

In another aspect, the listing of items in the quick deploy list is organized into "jobs" and identifies a path that indicates the source and destination for each job. A job is associated with one path and specifies one or more items of the source to be deployed and a schedule to deploy the specified item(s).

In another aspect, the deployment server is configured by the administrator with permissions for specific authors to list items in the quick deploy list. In some implementations, the configuration can limit the paths that an author is permitted to quick deploy content.

In yet another aspect, the deployment server creates a remote job on the destination network to import content being exported by the deployment server.

Embodiments may be implemented as a computer process, a computer system (including mobile handheld computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing various embodiments. However, other embodiments may be implemented in many different forms and should not be construed as limited to the embodiments set forth herein; rather, these embodiments are provided so that this disclosure will be thorough and complete. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Exemplary Content Deployment System

Figure 1:
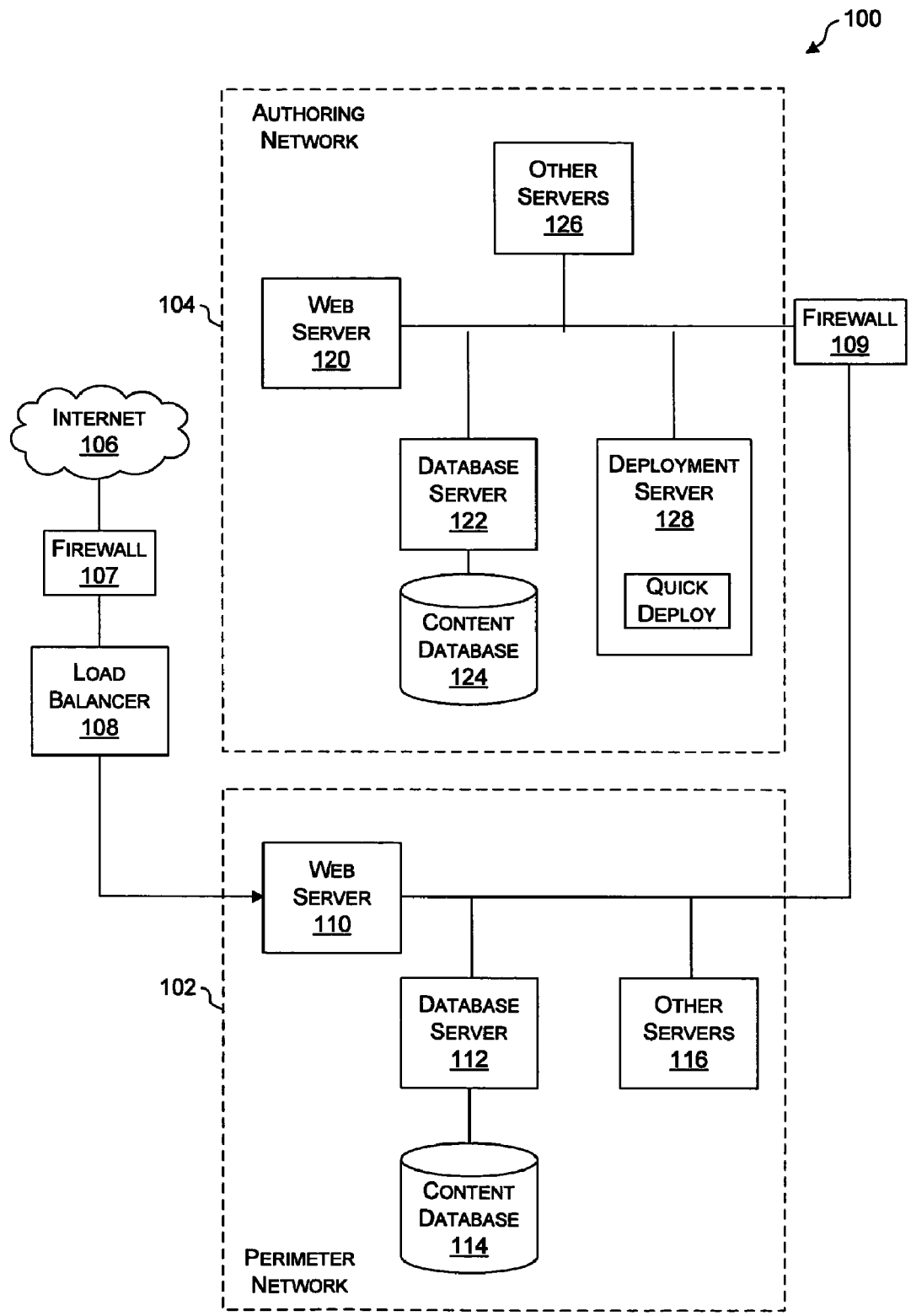
FIG. 1 is a block diagram representing an exemplary system that supports quick deployment of content between networks, in accordance with an embodiment.

FIG. 1 illustrates a system 100 that supports quick deployment of content between networks, in accordance with an embodiment. In this exemplary embodiment, system 100 includes a perimeter network 102 and an authoring network 104. In some embodiments, perimeter network 102 and authoring network 104 are independent server farms. In other embodiments, system 100 includes one or more staging networks (not shown) coupled between perimeter and authoring networks 102 and 104. In still other embodiments, system 100 includes multiple perimeter networks. In yet other embodiments, system 100 includes multiple authoring networks. Content authored in authoring network 104 can be deployed to perimeter network 102 for access via an external network 106 such as, for example, the Internet.

Further, in this embodiment, system 100 includes a firewall 107 and a load balancer 108 coupled between perimeter network 102 and external network 106. System 100 also includes a firewall 109 coupled between authoring network 104 and perimeter network 102, in this embodiment. In some other embodiments, one or more of load balancer 108 and firewalls 107 and 109 may be omitted.

Perimeter network 102, in this embodiment, includes a web server 110, a database server 112, a content database 114, and other servers 116. Content to be accessible to external network is stored in content database 114. Users connected to external network 106 can access the content stored in content database 114 via web server 110 and database server 112. In some embodiments, servers 116 include one or more of an application server, a domain controller server, operations management servers, backup servers, etc., that are typically used in server farms. In some embodiments, the deployment function including the quick deploy feature may be implemented using any of the servers of perimeter network 102.

Authoring network 104, in this embodiment, includes a web server 120, a database server 122, a content database 124, other servers 126, and a deployment server 128. Web server 120, database server 122, content database 124 and other servers 126, in one embodiment, are similar to previously described web server 110, database server 112, content database 114 and other servers 116. In accordance with this embodiment, deployment server 128 includes a quick deploy feature that allows deployment server 128 to deploy content (e.g., an item and any of its dependencies) listed in a quick deploy list (not shown) to another network (e.g., perimeter network 102) without having to get specific administrator authorization for the deployment. In some embodiments, deployment server 128 may be omitted and the deployment function (including the quick deploy feature) may be implemented using any of the servers of authoring network 104. Exemplary components to implement one embodiment of the quick deploy feature are described below in conjunction with FIG. 2.

This quick deploy feature is advantageously used to quickly deploy content that the author considers time sensitive, without having to find the administrator. For example, if the author wants to deploy content related to an important event that has recently occurred (e.g., a news story, an emergency, etc.), the author can quickly deploy updated content to replace the previously deployed content. Another scenario in which the quick deploy feature is useful is when the author discovers that some previously deployed content should not have been deployed because it contained inaccurate information, malicious code, confidential information, etc. The author can use the quick deploy feature to replace the "defective" content.

Figure 2:
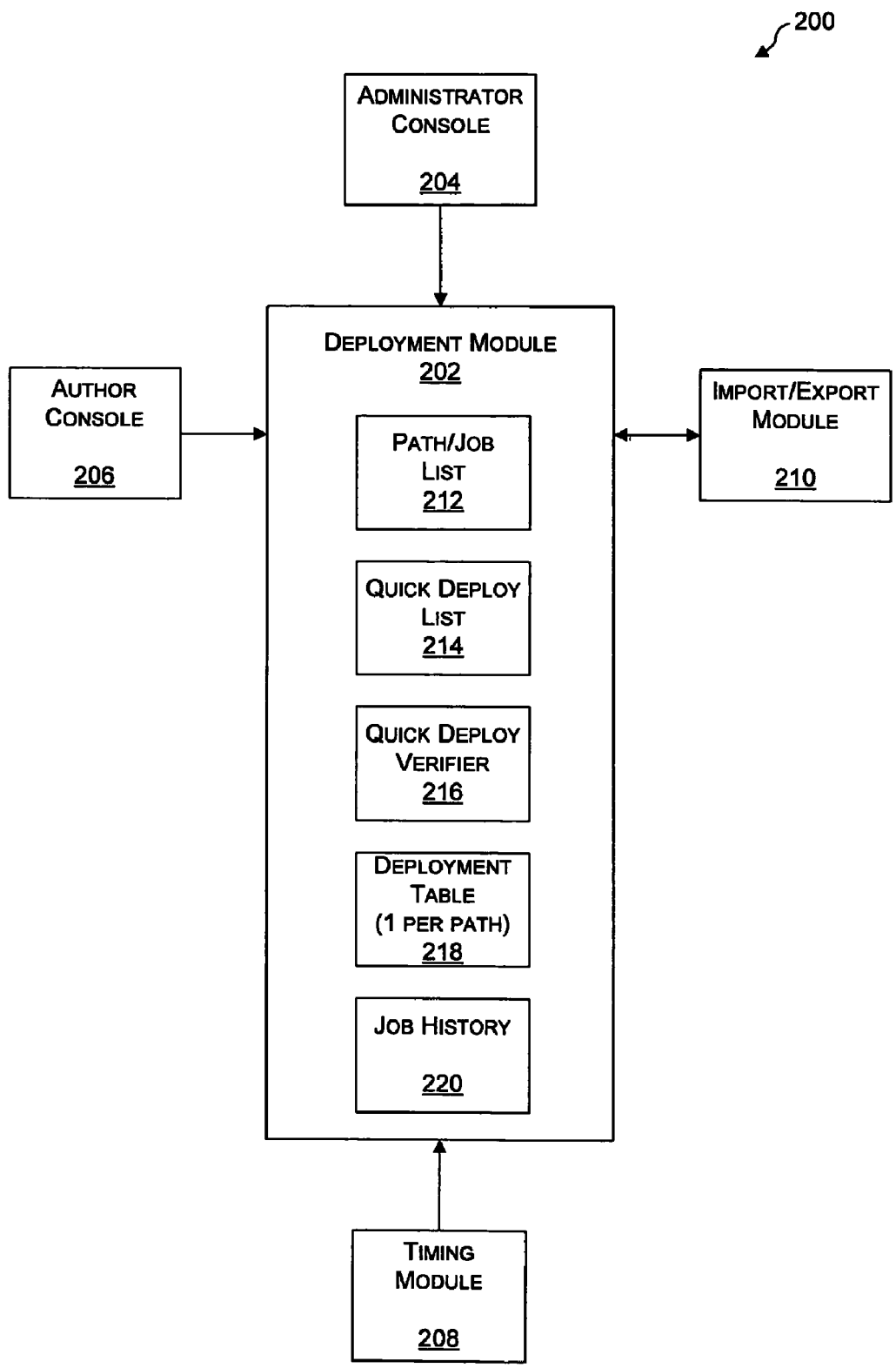
FIG. 2 is a block diagram representing some components of a deployment server, in accordance with an embodiment.

FIG. 2 illustrates several components of a deployment server 200 that can be used in implementing deployment server 128 (FIG. 1), in accordance with an embodiment. In this exemplary embodiment, deployment server 200 includes a deployment module 202, an administrator console 204, an author console 206, a timing module 208 and an import/export module 210. Further, in this embodiment, deployment module 202 includes a path/job list 212, a quick deploy list 214, a quick deploy verifier module 216, a deployment table 218 and a job history 220. These components are described below.

Administrator console 204, in this embodiment, provides an interface for an administrator to enter settings of deployment module 212. For example, an administrator can use administer console 204 to: add, delete and modify paths and jobs listed in path/job list 212. In this embodiment, a path identifies a source site collection and a destination site collection for deploying content. In addition, in this embodiment, a path can be disabled by setting a disabled property of the path. In some implementations, a site collection can be a web page. In addition, paths can contain authentication information, settings for how to handle user information (e.g., the author who created or modified the content), and settings for how to handle security settings and access control lists (ACLs). Further, in this embodiment, deployment module 202 includes one deployment table 218 per path. In one embodiment, a job (in this content deployment context) is associated with one path and specifies one or more items of the source site collection to be deployed and a schedule on with to deploy the specified item(s). In one embodiment, a job can be disabled by setting a disabled property of the job.

Further, in accordance with this embodiment, administrator console 204 can be used by the administrator to set permissions for quick deploy list 214. For example, the administrator can give permission to selected authors to add items to quick deploy list 214. In some embodiments, an administrator can limit which path(s) a particular author has permission to use the quick deploy feature.

Author console 206, in this embodiment, provides an interface for an author to add content to a site collection (e.g., site collections residing in the authoring network). In addition, author console 206 also provides an interface for an author to make add content information (e.g., item and path identifiers) to quick deploy list 214.

Timing module 208, in this embodiment, provides a signal to deployment module 202 whenever a job is to be performed. In one embodiment, an administrator may use administrator console 204 to configure timing module 208 to "wake up" deployment module 202 at scheduled times.

Import/export module 210, in this embodiment, implements a transport mechanism to obtain the content from a content data store (e.g., content database 124 of FIG. 2), package the content, and send the packaged content to the destination. In this embodiment, import/export module 210 can also receive packaged content, unpack the content and store the content in the content data store. In one embodiment, the content is packaged into a Microsoft cabinet ("CAB") file, and sent using one or more Simple Object Access Protocol (SOAP) HyperText Transfer Protocol (HTTP) messages (e.g., according to SOAP Version 1.2 specification 24 Jun. 2003).

In accordance with this embodiment, import/export module 210 also includes in the package all of the dependencies of each item being packaged. As used in this context, dependencies refer to other items that referred to by the item. For example, the item may be a web page having links to other web pages, images, etc. In one embodiment, a resource gallery (not shown) is used to identify the dependencies. Further, when receiving a package (i.e., during an import), import/export module 210 determines the proper references for the dependencies when deployed in the destination network. For example, if the item is a web page that includes a dependency that is a link to another web page, at the destination, the link is corrected so that it references an address in the destination network (where the dependency web page is deployed) instead of to an address in the source network.

Deployment module 202, in this embodiment, controls what content is deployed and where it is deployed. In accordance with one embodiment, deployment module 202, when "woken up" by timing module 208, accesses path/job list 212 and quick deploy list 214 to determine: if there are jobs are scheduled to be performed at this time; the location of the source content (e.g., the source site collection), the location of the destination (e.g., the destination site collection), the job type, etc. In one embodiment, deployment module 202 first checks quick deploy list 214 for any quick deploy jobs to be performed, and then checks path/job list 212 for jobs scheduled to be performed.

Further, in accordance with this embodiment, deployment module 202 also controls which items can be added to quick deploy list 214 (by adding the item's reference or identifier) via quick deploy verifier module 216. For example, verifier module 216 can determine whether the author attempting to add an item to quick deploy list 214 has permission to do so. The verifier, in one embodiment, includes an authentication component to ensure that the author is not being "impersonated". In some embodiments, verifier module 216 can also determine whether the author has permission to quick deploy content for the path associated with the job. For example, in a news website scenario, a sportswriter may have permission to quick deploy sports stories or scores, but not other types of news.

In one implementation, in performing a job, deployment module 202 inspects deployment table 218 corresponding to the job's path to determine when an item of a site collection was last deployed. In one embodiment, the deployment table includes a listing of items and timestamps (each timestamp represents the time the corresponding item was last deployed). Depending on the job type and other job settings, an item included in the job may not need to be completely or canonically deployed; rather, only the data that has changed since the last deployment of the item will be deployed in some embodiments. In such embodiments, deployment module 202 compares the current version of the item to be deployed with the version corresponding to the timestamp of the last deployment (from deployment table 218) and can then determine the "delta" between the two versions. The deployment can then include just the "delta", which can advantageously reduce the amount of data that needs to be transferred and the time needed to deploy the item.

Deployment module 202, in this embodiment, also updates job history table 220 to include information related to the job (e.g., a job identifier, the time that the job was started, the time when the job ended, success or failure of the job, etc.).

Figure 3:
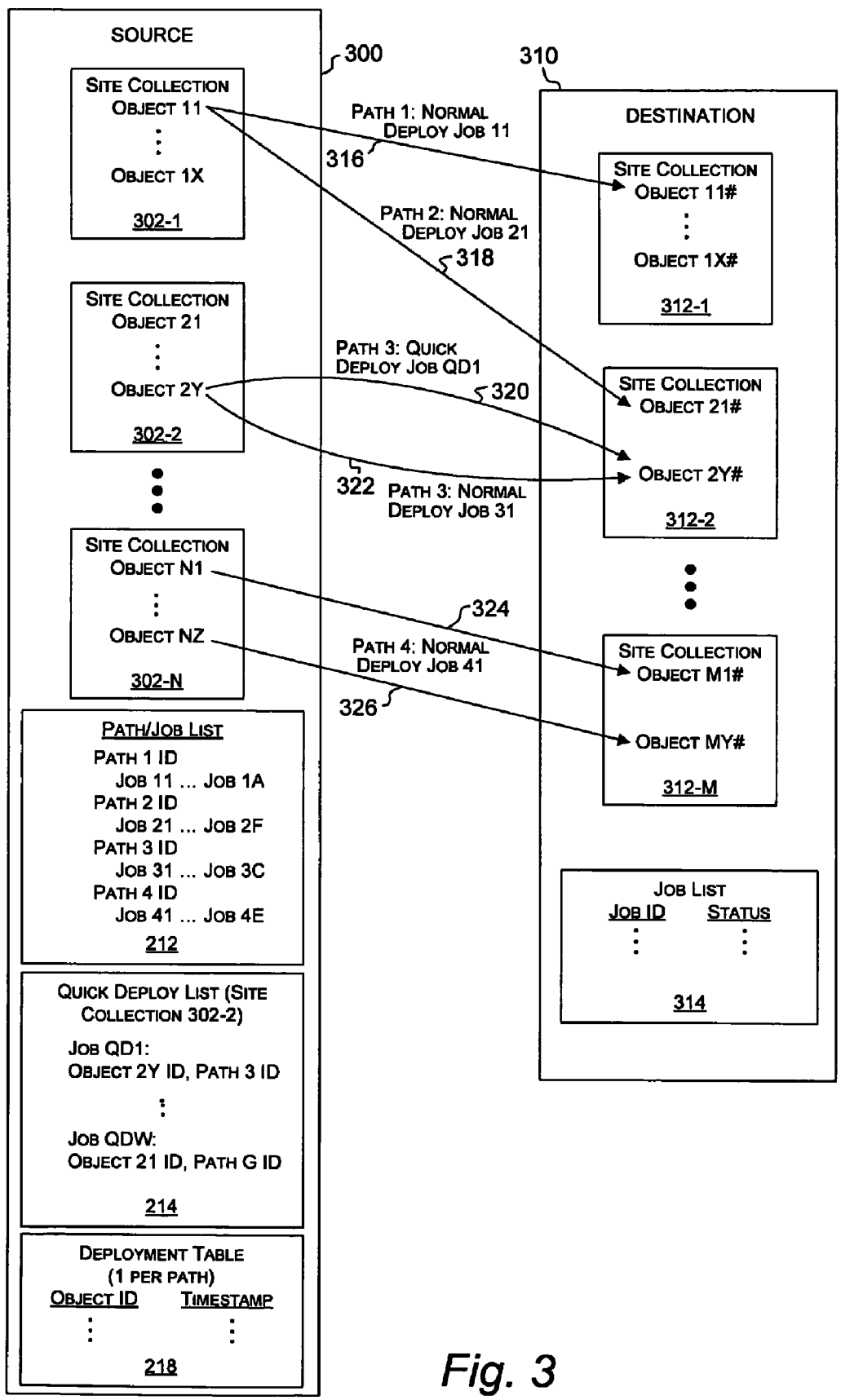
FIG. 3 is a representation of data structures used in deploying content between a source and a destination, in accordance with an embodiment.

FIG. 3 illustrates data structures used in deploying content between a source 300 and a destination 310, in accordance with an embodiment. For example, source 300 can reside in an authoring network such as authoring network 104 (FIG. 1) and destination 310 can reside in a perimeter network such as perimeter network 102 (FIG. 1).

In this exemplary embodiment, source 300 includes a site collection 302-1 containing an object 11 through an object 1X as content items, a site collection 302-2 containing an object 21 through an object 2Y as content items, and so on to a site collection 302-N containing an object N1 through an object NZ as content items. In this example embodiment, source 300 also includes the aforementioned path/job list 212, quick deploy list 214 for site collection 302-2 and deployment table 218. In this embodiment, the other site collections of source 300 may each have a corresponding quick deploy list (not shown).

As illustrated in FIG. 3, path/job list 212 lists a Path 1 ID having a Job 11 through a Job 1A, . . . , and so on to a path ID Path 4 having a Job 41 through a Job C4E.

In this example, quick deploy list 214 corresponds to site collection 302-2 and lists a Job QD1 specifying an Object 2Y and path ID for Path 3, . . . , and so on to a Job QDW specifying an Object 21 and path ID for Path G (not shown in FIG. 3). In other embodiments, the path ID is omitted from quick deploy list 214 because the path ID is implicit in the job (i.e., a job belongs to only one path). Deployment table 218, in this example, containing a list of object IDs and, corresponding to each object ID, the timestamp of the last deployment time of the object identified by the object ID.

Destination 310 includes a site collection 312-1 containing an object 11# through an object 1X# as content items, a site collection 312-2 containing objects as content items, and so on to a site collection 312-M containing an object M1# through an object MY#. In this example embodiment, destination 310 also includes a job list 314 used to track jobs and their status (e.g., completed or failed).

An object can be deployed to one or multiple site collections in the destination using normal deployment jobs. FIG. 3 shows an example in which Object 11 of site collection 302-1 is deployed site collection 312-1 using Path 1 when a Job 11 is performed, as indicated by an arrow 316. A deployment module (not shown) residing in the network containing destination 310 then processes the received package and deploys Object 11 in destination 310, which is shown as Object 11# in destination 310. The deployment module then updates job list 314.

In addition, Object 11 is also deployed to site collection 312-2 using Path 2 when a Job 21 is performed, as indicated by an arrow 318. Job 21 is commonly performed at a different time than Job 11. The deployment module of destination 310 deploys Object 11 as an Object 21# in site collection 312-2. After Job 21 is performed, the deployment module updates job list 314. Jobs 11 and 21 are listed in path/job list 212.

An object can also be deployed to one or more site collections in the destination using quick deploy jobs. In this example, Job QD1 listed in quick deploy list 214 specifies that Object 2Y is to be deployed using Path 3. Path 3 in this example is the path from site collection 302-2 of source 300 to site collection 312-2 of destination 310. A deployment module (not shown) such as deployment module 202 (FIG. 2) residing in the network containing source 300, when woken up by timing module 208 (FIG. 2), inspects quick deploy list 214 and performs Job QD1 of quick deploy list 214. In this example, the deployment module packages and exports Object 2Y and its dependencies from site collection 302-1 to site collection 312-1, as indicated by an arrow 320 in FIG. 3. The deployment module residing in the network containing destination 310 then processes the received package and deploys Object 2Y in destination 310, which is shown as Object 2Y# in FIG. 3. As previously mentioned, in some embodiments the dependencies of Object 2Y are also deployed in site collection 312-1 and the references to the dependencies deployed in destination 310 are corrected in the resource gallery. The destination's deployment module then updates job list 314.

Further, the same path and objects of a quick deploy job can also be defined in a normal deployment job (which would be performed at a different time compared to the quick deploy job). In this example, Path 3 includes a Job 31 as shown in path/job list 212. This normal deployment of Object 2Y and its dependencies to site collection 312-2 is indicated by an arrow 322 in FIG. 3.

Also shown in this example is the normal deployment of content (i.e., a Job 41) along a Path 4. In this example, Path 4 is the path from site collection 302-N to site collection 312-M, and Job 41 is the deployment of multiple objects. In this example, Object N1 of site collection 302-N is deployed as Object M1# of site collection 312-M as part of Job 41, as indicated by an arrow 324 of FIG. 3. In addition, in this example, Object NZ of site collection 302-N is deployed as Object MY# of site collection 312-M. As previously described, this job would be performed according to the schedule, which is included in the job's information in one embodiment. In addition, in some deployment jobs, the deployment module would access the deployment table 218 corresponding to Path 4 to determine when Objects N1 and NZ of site collection 302-2 were last deployed, and then determine what content has changed or is new (i.e., the "delta") and then deploy this delta rather than Objects N1 and NZ and their dependencies in their entirety.

Exemplary Source Operational Flow in Deploying Content

Figure 4:
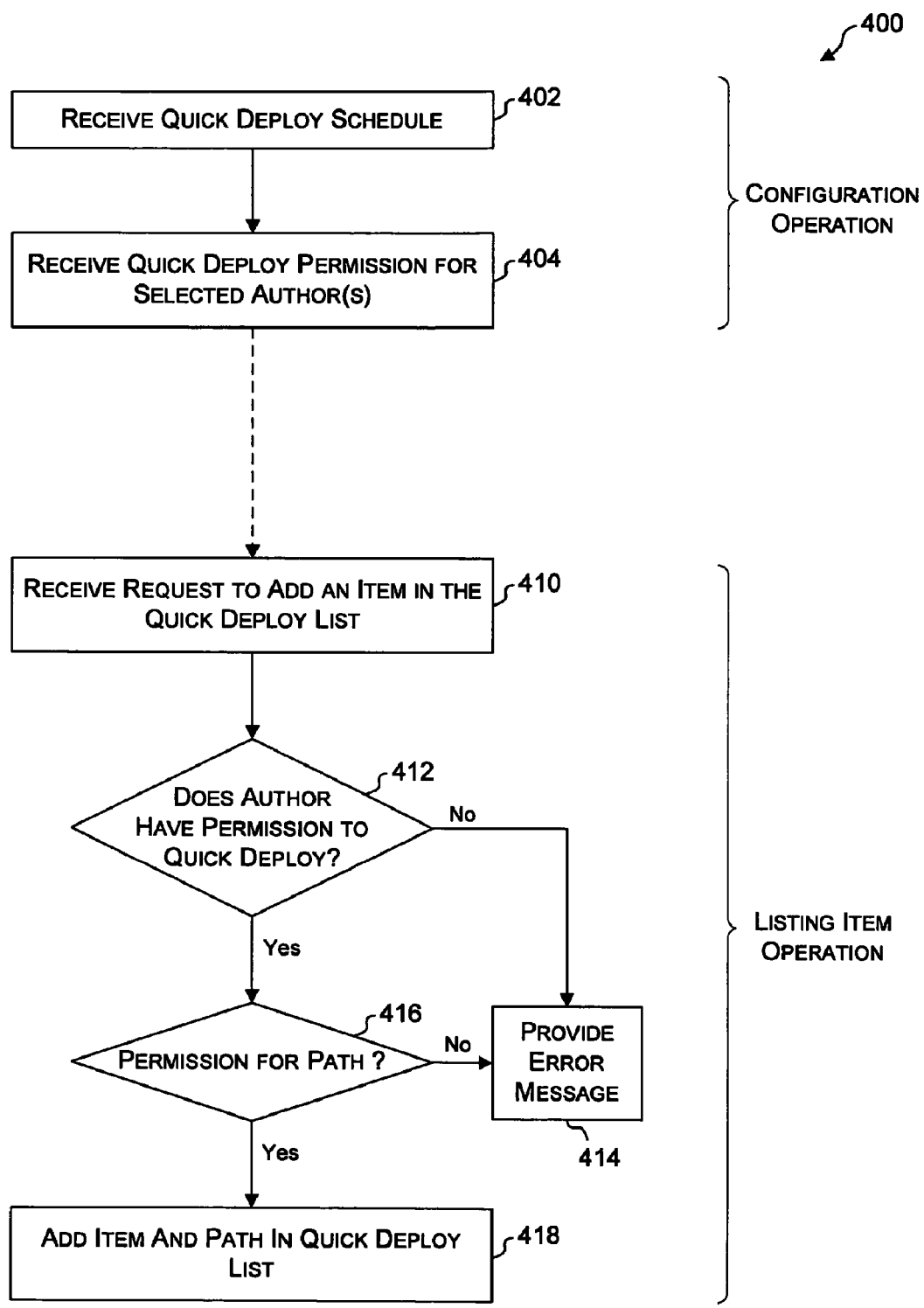
FIG. 4 is a flow diagram representing operational flow in creating and adding an item to a quick deploy list, in accordance with an embodiment.

FIG. 4 illustrates an operational flow 400 in using a quick deploy list, in accordance with an embodiment. Operational flow 400 may be performed in any suitable computing environment. For example, operational flow 400 may be executed by a system such as system 200 (FIG. 2). Therefore, the description of operational flow 400 may refer to at least one of the components of FIG. 2. However, any such reference to components of FIG. 2 is for descriptive purposes only, and it is to be understood that the implementations of FIG. 2 are a non-limiting environment for operational flow 400.

At a block 402, a schedule for deploying items in the quick deploy list (such as quick deploy list 214 shown in FIG. 2) is received. In one embodiment, an administrator can use an administrator console such as administrator console 204 (FIG. 2) to set a schedule for deploying items listed in the quick deploy list. For example, the administrator can set the schedule so that a deployment module such as deployment module 202 (FIG. 2) will check the quick deploy list every five minutes. In one embodiment, the schedule is set on a per-quick deploy job basis. Thus, in scenarios in which the quick deploy list contains entries for multiple items to be deployed via multiple quick deploy jobs, the schedule may assign different times for performing those quick deploy jobs. In some embodiments, multiple items may be quick deployed in one quick deploy job.

At a block 404, quick deploy permission for selected author(s) is received. In some embodiments, the administrator can also use the administrator console to select which author or author have permission to list items in the quick deploy list. In one embodiment, the administrator can also select the path(s) that each author has permission to use quick deploy. After the quick deploy list is "configured" with a schedule and permissions, operational flow 400 can proceed to a block 410.

At block 410, a request to list an item in the quick deploy list is received. In some embodiments, an author can use an author console such as author console 206 to select an item and path for quick deploy. This request is then received by the deployment module. In one embodiment, the request is received by a verifier module, such as quick deploy verifier module 216 (FIG. 2).

At a block 412, it is determined whether the author making the request has permission to add items in the quick deploy list (e.g., by adding the items' identifiers or locators to the quick deploy list). In one embodiment, the aforementioned verifier module determines whether the author is authorized to add items in the quick deploy list. If it is determined that the author does not have permission to quick deploy, operational flow 400 can proceed to a block 414 at which the author is given an error message or indicate and the item is not added in the quick deploy list. However, if it is determined that the author does have permission to quick deploy, operational flow 400 can proceed to a block 416.

At block 416, it is determined whether the author making the request has permission to quick deploy along the selected path of the request. In this embodiment, the verifier module also makes this determination. If the selected path is not permitted for the author, operational flow 400 can proceed to previously described block 414. However, if it is determined that the author is permitted to use the path, the item and path are added to the quick deploy table as indicated by a block 418.

As previously described, each site collection of the source may have a corresponding quick deploy list. In some such embodiments, permissions are set on a per quick deploy list basis. Thus, in scenarios in which there are multiple quick deploy jobs originating from the same site collection but going to different destination site collections, the quick deploy jobs may have different schedules but share the same permissions.

Although operational flow 400 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Figure 5:
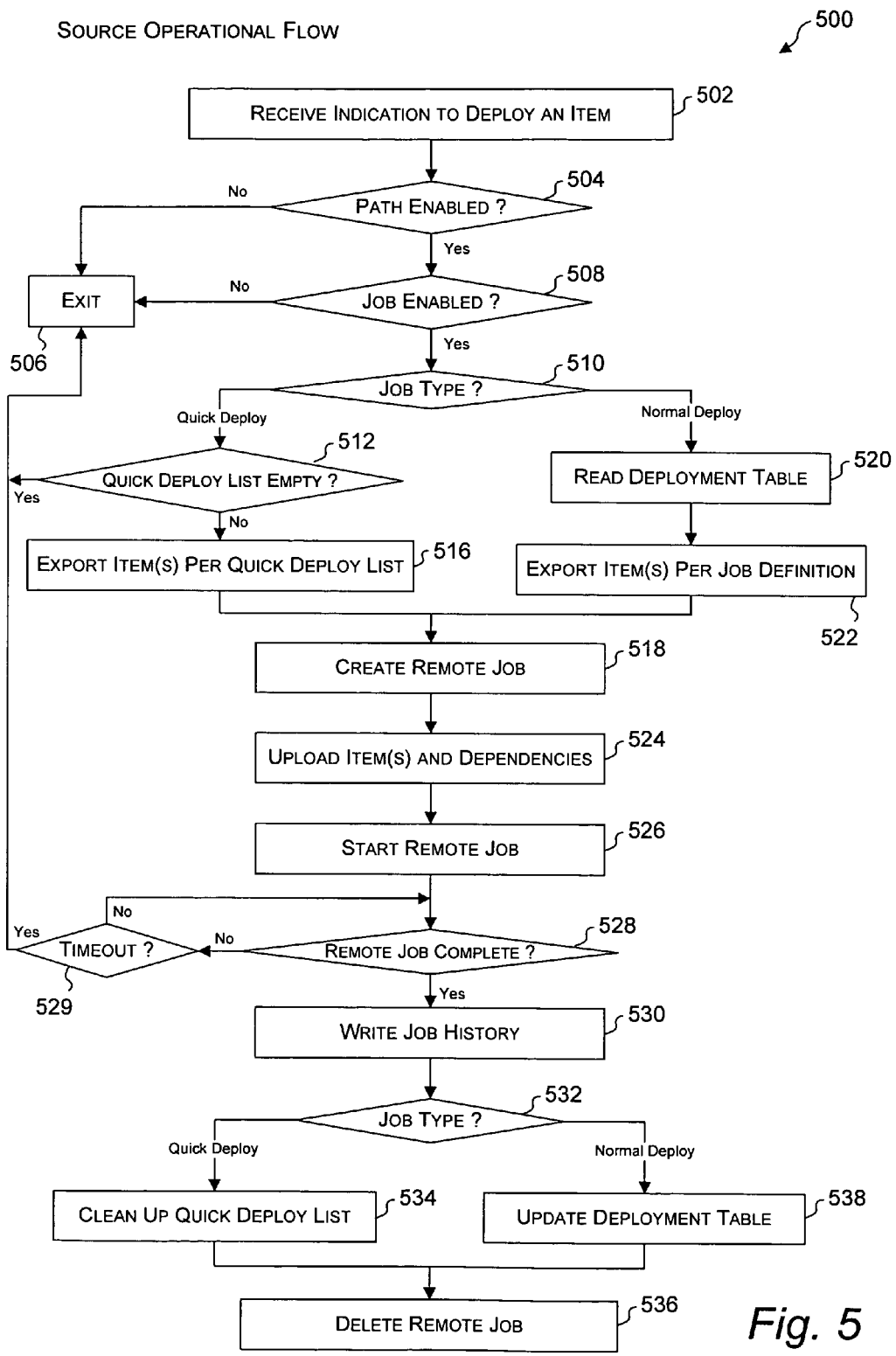
FIG. 5 is a flow diagram representing operational flow of a content source in deploying content, in accordance with an embodiment.

FIG. 5 illustrates an operational flow 500 of a content source in deploying content, in accordance with an embodiment. Operational flow 500 may be performed in any suitable computing environment. For example, operational flow 500 may be executed by a system such as system 200 (FIG. 2). Therefore, the description of operational flow 500 may refer to at least one of the components of FIG. 2. However, any such reference to components of FIG. 2 is for descriptive purposes only, and it is to be understood that the implementations of FIG. 2 are a non-limiting environment for operational flow 500.

At a block 502, an indication to deploy an item is received. In one embodiment, a deployment module such as deployment module 202 (FIG. 2) receives a signal or message from a timing module to wake-up and determine whether any content needs to be deployed. In one embodiment, the timing module is configured to wake-up the deployment module according to a schedule that meets the scheduling requirements of the quick deploy feature and all of the "normal" deployment jobs. The deployment module then determines which job(s) are scheduled to be performed.

At a block 504, it is determined whether the path associated with the job is enabled. In one embodiment, the aforementioned deployment module inspects a disabled property of a set of global settings that apply to all paths. In some embodiments, a path can be disabled on a per-path basis instead of or in addition to the global basis. If the path is disabled, operational flow 500 can proceed to a block 506 to exit. However, if the path is enabled, operational flow 500 can proceed to a block 508.

At block 508, it is determined whether the job is enabled. In one embodiment, the aforementioned deployment module inspects a disabled property of the aforementioned global settings to determine whether all of the jobs are disabled. In some embodiments, a job can be disabled on a per-job basis instead of or in addition to the global basis. If the is disabled, operational flow 500 can proceed to block 506 to exit. However, if the job is enabled, operational flow 500 can proceed to a block 510.

At block 510, the job type of the job is determined. In this embodiment, the deployment module inspects a job type property of the indication provided at block 502 to determine whether the job type is a quick deploy type or a normal deploy type. If it is determined that the job type is a quick deploy type, operational flow proceeds to a block 512.

At block 512, it is determined whether the quick deploy list is empty. In one embodiment, the deployment module inspects the quick deploy list to determine if there are any quick deploy jobs to be performed. If it is determined that the quick deploy list is empty, operational flow 500 can proceed to block 506 to exit. However, if it is determined that the quick deploy list is not empty, operational flow 500 can proceed to a block 516.

At block 516, all items listed in the quick deploy list (for the particular quick deploy job being performed) is exported. In one embodiment, the deployment module obtains the item(s) and its dependencies (if any) from a content database such as content database 124 (FIG. 1). In one embodiment, the item(s) and its dependencies are then packaged for export to the destination specified in the quick deploy job. In one embodiment, a module such as import/export module 210 (FIG. 2) packages the item and dependencies into a CAB file. This block can be repeated for each job listed in the quick deploy list.

At a block 518, a remote job is created at the destination. In one embodiment, the deployment module provides an indication to a deployment server of a network in which the destination resides to create the remote job. For example, the destination's deployment server may implement a method that the deployment module can call to create the remote job. Returning to block 510, if it is determined that the job type is a normal deploy type, operational flow 500 can proceed to a block 520.

At block 520, a deployment table such as deployment table 218 (FIGS. 2 and 3) is read. In one embodiment, the deployment module inspects a path/job list such as path/job list 212 (FIG. 2) to determine the path and job that is to be performed. The deployment module can then read the deployment table associated with the job's path to determine when the items were last deployed. As previously described, this deployment information can then be selectively used to determine the "delta" of the item(s) to be deployed.

At a block 522, the item(s) of the job are exported. In one embodiment, the item(s) and their dependencies are then packaged for export to the destination specified in the job definition. In one embodiment, the aforementioned import/export module packages the item(s) and dependencies into a CAB file. Then operational flow 500 can proceed to previously described block 518 to create a remote job at the destination.

At block 524, the package is uploaded to the destination. In one embodiment, the module that packaged the item(s) and dependencies also uploads the package to the destination using one or more SOAP HTTP messages.

At a block 526, the remote job created at block 518 is started. In one embodiment, the deployment module provides an indication to the destination's deployment server to start the remote job. For example, the destination's deployment server may implement a method that the deployment module can call to start the remote job. Block 526 causes the destination to deploy the content contained in the package.

At a block 528, it is determined whether the remote job has completed or timed-out. In one embodiment, the deployment module will poll the destination to determine whether the remote job has completed. If the remote job has timed-out, operational flow 500 can return to block 506 to exit. However, if the remote job has completed, operational flow 500 can proceed to a block 530.

At block 530, the result of the remote job is written to a job history such as job history 220 (FIG. 2). In one embodiment, the deployment module writes the result to the job history.

At a block 532, the job type of the job is determined. In one embodiment, block 532 is basically the same as previously described block 510. If the job type was determined to be the quick deploy type, then operational flow 500 can proceed to a block 534 at which the quick deploy list is cleared because all of the quick deploy jobs were completed or timed out. Operational flow 500 can then proceed to a block 536.

At block 536, the remote job is deleted at the destination. In one embodiment, the deployment component causes the destination to delete the remote job. For example, the destination's deployment server may implement a method that the deployment module can call to delete the remote job.

However, if at block 532 (or block 510) the job type was determined to be the normal deploy type, then operational flow 500 can proceed to a block 538 at which the deployment table corresponding to the job's path is updated to reflect the time at which the item(s) were deployed. Operational flow 500 can then proceed to previously described block 536 to delete the remote job.

Although operational flow 500 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Exemplary Destination Operational Flow in Deploying Content

Figure 6:
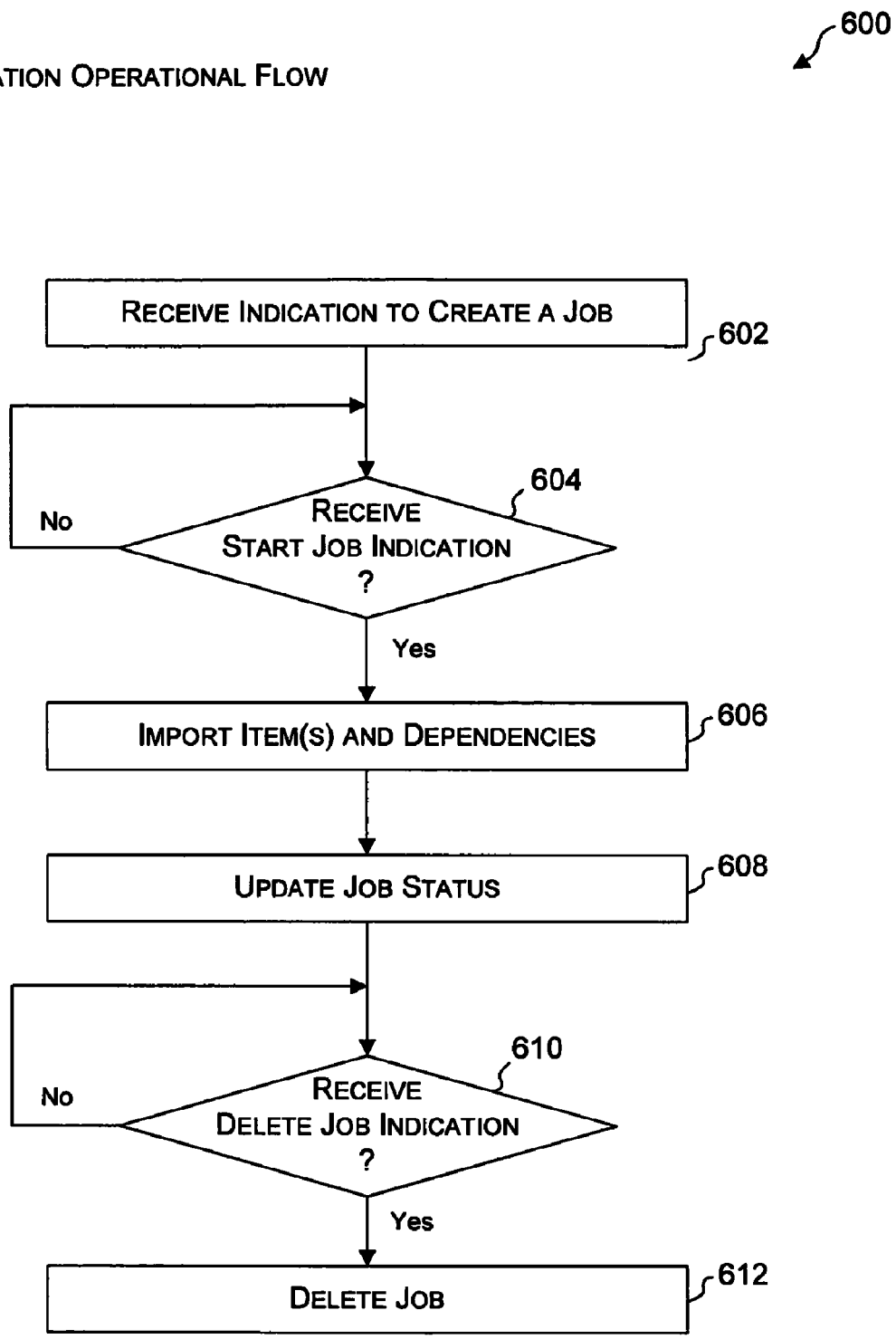
FIG. 6 is a flow diagram representing operational flow of a content destination in deploying content, in accordance with an embodiment.

FIG. 6 illustrates an operational flow 600 of a content destination in deploying content, in accordance with an embodiment. Operational flow 600 may be performed in any suitable computing environment. For example, operational flow 600 may be executed by a system such as system 100 (FIG. 1). Therefore, the description of operational flow 600 may refer to at least one of the components of FIG. 1. However, any such reference to components of FIG. 1 is for descriptive purposes only, and it is to be understood that the implementations of FIG. 1 are a non-limiting environment for operational flow 600.

At a block 602, an indication to create a job is received by a content deployment destination. In this context, a job refers to the process of receiving a package of content, unpacking the package and storing the content and its dependencies at the destination. In one embodiment, the destination is a network having a destination deployment server (e.g., a web front end server as web server 110 of FIG. 1) that handles content reception from another network. In this embodiment, the destination deployment server has a destination deployment component (not shown) that implements a method that can be called by another component to create a job on the destination deployment server. In one embodiment, the method also creates a job identifier for the job and adds it to a job list such as job list 314 (FIG. 3). In one scenario, a deployment component of a source calls the method to create the job (e.g., see block 518 of FIG. 5).

At a block 604, operational flow 600 waits for an indication to start the job that was created at block 602. In this embodiment, the destination deployment component implements another method that when called starts the job. In one scenario, the deployment component that created the job also starts the job when the content is ready to be transferred (e.g., see block 526 of FIG. 5). When the job is started, operational flow 600 can proceed to a block 606.

At block 606, the content specified by the job is imported from the source. In one embodiment, the destination deployment component downloads the item(s) and dependencies (if any) that was package by the source and stores them in a content database such as content database 114. Further, the destination deployment component also corrects the references to the dependencies so that they reference items residing in the destination rather than the source.

At a block 608, the job list is updated. In one embodiment, the destination deployment component writes information into a status field of the job list to indicate success or failure of the job. In one embodiment, the source can poll the job list to determine whether the job has completed (e.g., see block 528 of FIG. 5).

At a block 610, operational flow 600 waits for an indication to delete the job. In one embodiment, the destination deployment component implements another method that deletes the job when called. In one scenario, the deployment component that created the job also deletes the job when it detects that the job has completed (e.g., see block 536 of FIG. 5). In one embodiment, the job is completed when the status indicates either success or failure or timed-out.

Although operational flow 600 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Reference has been made throughout this specification to "one embodiment," "an embodiment," or "an example embodiment" meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems disclosed herein without departing from the scope of the claimed invention.

What is claimed is:

1. A computer-implemented method for deploying content from a source to a destination, the method comprising:
    controlling, by a deployment module residing in a source network comprising the source, importing of a job at the destination, wherein the job specifies one or more items from a source site collection of items residing in the source network to be imported at the destination;
    receiving, by the deployment module, an indication to deploy a first item of the one or more items from the source site collection of items residing in the source network to a destination site collection of items residing in a destination network;
    determining whether a path specifying the source site collection of items and the destination site collection of items is enabled;
    determining whether the job specifying the first item to be deployed and a deployment schedule of the first item is enabled;
    obtaining, by the deployment module, the first item and one or more dependencies of the first item referred to by the first item;
    packaging the first item and the one or more dependencies of the first item of the one or more items for export to the destination;
    creating, by the deployment module, a remote job at the destination for deploying the first item and the one or more dependencies of the first item contained in the package;
    uploading the package to the destination, wherein the uploading comprises uploading the first item in response to the path and job being enabled, wherein uploading the first item includes identifying and uploading the one or more dependencies of the first item referred to by the first item;
    starting, by the deployment module, the remote job at the destination to import the uploaded first item, wherein starting the remote job comprises calling a method to start the remote job;
    polling, by the deployment module, to determine a status of the remote job at the destination;
    tracking, by the deployment module, job history information, wherein the job history information comprises information related to the remote job, and wherein the information related to the remote job comprises a time when the remote job was started, a time when the remote job ended, and an indication whether the remote job succeeded; and
    causing, by the deployment module, the destination to delete the remote job.

2. The method of claim 1 further comprising determining whether the job is listed in a quick deploy list.

3. The method of claim 2 wherein an author listed the job in the list without having to seek permission from an administrator.

4. The method of claim 2 further comprising clearing the list in response to the job being completed.

5. The method of claim 1 further comprising determining what data has changed in the first item since the first item was last deployed.

6. The method of claim 5 further comprising updating a table with information indicative of the first item's version.

7. An apparatus for deploying content from a source to a destination, the apparatus comprising:
    one or more processors for executing processor executable instructions;
    one or more computer storage media, wherein the computer storage media does not consist of a signal, for storing the processor executable instructions that when executed by the one or more processor perform a method comprising:
    controlling, by a deployment module residing in a source network comprising the source, importing of a job at the destination, wherein the job specifies one or more items from a source site collection of items residing in the source network to be imported at the destination;
    receiving, by the deployment module, an indication to deploy a first item from the source site collection of items residing in the source network to a destination site collection of items residing in a destination network;
    obtaining, by the deployment module, the first item and one or more dependencies of the first item referred to by the first item;
    packaging the first item and the one or more dependencies of the first item for export to the destination network;
    creating, by the deployment module, a remote job at the destination for deploying the first item and the one or more dependencies contained in the package;
    uploading the package to the destination, wherein the uploading comprises uploading the first item from the source site collection, wherein uploading the first item includes identifying and uploading the one or more dependencies of the first item referred to by the first item;
    starting, by the deployment module, the remote job at the destination to import the uploaded first item, wherein starting the remote job comprises calling a method to start the remote job;

polling, by the deployment module, to determine a status of the remote job at the destination;

tracking, by the deployment module, job history information, wherein the job history information comprises information related to the remote job, and wherein the information related to the remote job comprises a time when the remote job was started, a time when the remote job ended, and an indication whether the remote job succeeded; and causing, by the deployment module, the destination to delete the remote job.

8. The apparatus of claim 7 further comprising a database in the destination network to store the one or more dependencies and the uploaded first item with one or more references to locations at which the dependencies are stored in the database.

9. The apparatus of claim 7 further comprising a first list identifying items that are to be deployed at a time scheduled for the list and a second list containing paths and jobs, wherein items identified in the second list are to be deployed according to a schedule specified by one or more jobs.

10. The apparatus of claim 9 wherein an author is able to list the first item in the first list without having to seek permission from an administrator.

11. A computer-readable storage medium, wherein the computer storage media does not consist of a signal, storing computer-executable instructions for deploying content from a source to a destination, the method comprising the steps of:

controlling, by a deployment module residing in a source network comprising the source, importing of a job at the destination, wherein the job specifies one or more items of from a source site collection of items residing in the source network be imported at the destination;

receiving, by the deployment module, an indication to deploy a first item from the source site collection of items residing in the source network to a destination site collection of items residing in a destination network;

obtaining, by the deployment module, the first item and one or more dependencies of the first item referred to by the first item;

packaging the first item and the one or more dependencies of the first item for export to the destination;

creating, by the deployment module, a remote job at the destination for deploying the first item and the one or more dependencies contained in the package;

uploading the package to the destination, wherein the uploading comprises uploading the first item in response to the path and job being enabled, wherein uploading the first item includes identifying and uploading the one or more dependencies of the first item referred to by the first item;

starting, by the deployment module, the remote job at the destination to import the uploaded first item, wherein starting the remote job comprises calling a method to start the remote job;

polling, by the deployment module, to determine a status of the remote job at the destination;

tracking, by the deployment module, job history information, wherein the job history information comprises information related to the remote job, and wherein the information related to the remote job comprises a time when the remote job was started, a time when the remote job ended, and an indication whether the remote job succeeded; and causing, by the deployment module, the destination to delete the remote job.

12. The computer-readable storage medium of claim 11 further comprising determining whether the job is listed in a quick deploy list.

13. The computer-readable storage medium of claim 12 wherein an author listed the job in the list without having to seek permission from an administrator.

14. The computer-readable storage medium of claim 13 further comprising verifying whether the author has permission to list the job in the list.

15. The computer-readable storage medium of claim 12 further comprising clearing the list in response to the remote job being completed.

16. The computer-readable storage medium of claim 11 further comprising determining what data has changed in the first item since the first item was last deployed.

17. The computer-readable storage medium of claim 16 further comprising updating a table with information indicative of the first item's version.

18. The computer-readable storage medium of claim 11 further comprising updating, by the deployment module, a job history table to indicate if the remote job is completed.

* * * * *